Jan. 12, 1965  F. M. JENKINS ETAL  3,165,418
SYNTHETIC SPONGE AND METHOD OF MAKING SAME
Filed Aug. 16, 1961
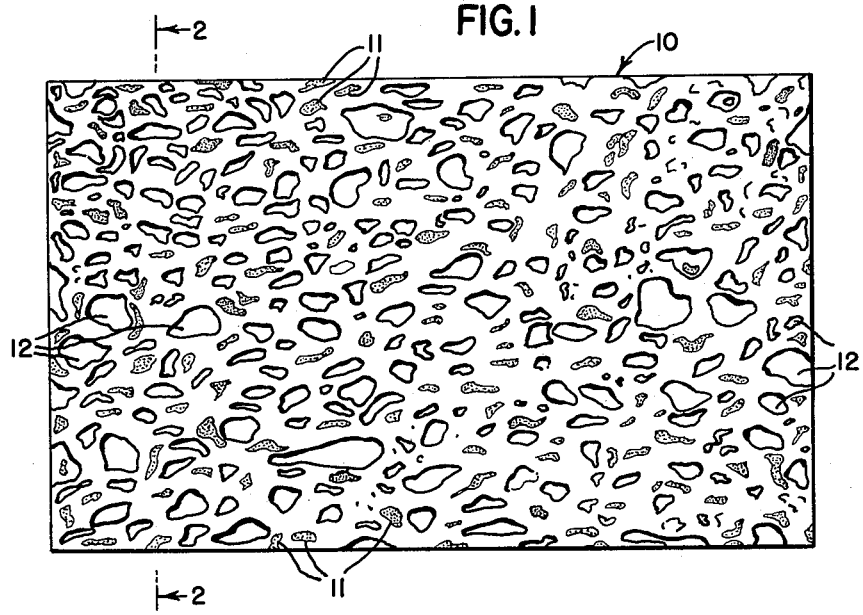
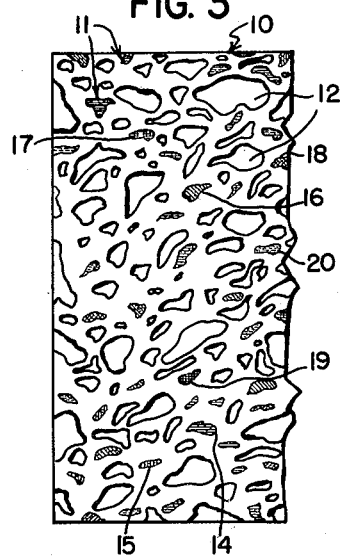
INVENTORS
FORD M. JENKINS
JACK A. BITZER
BY
Sherman J. Kemmer
AGENT

United States Patent Office 3,165,418
Patented Jan. 12, 1965

3,165,418
SYNTHETIC SPONGE AND METHOD OF
MAKING SAME
Ford M. Jenkins, Springfield, Ohio, and Jack A. Bitzer,
Conifer, Colo., assignors to General Mills, Inc., a corporation of Delaware
Filed Aug. 16, 1961, Ser. No. 131,756
2 Claims. (Cl. 106—122)

This invention relates in general to synthetic sponges, and more particularly, to sponges having improved scrubbing characteristics.

The useful cellulose sponge is not rough in character, and has a smooth and silky feel when wet. Thus, it inherently lacks the physical characteristics prerequisite to an effective scrubbing device. It would be highly desirable in many applications to have a cellulose sponge having increased abrasive property.

It is an object of this invention to provide a novel cellulose sponge product having improved abrasive properties. It is another object of this invention to provide a cellulose sponge product having increased wearing qualities. It is a further object of this invention to provide a novel abrasive cellulose sponge product having optimum liquid absorption characteristics. It is still another object of this invention to provide a process for preparing novel cellulose sponge products which contain nodules of compressed sponge material. Other objects will appear hereinafter.

The objects of this invention are accomplished by a process which comprises making a cellulosic dough matrix, dispersing nodules of pre-made regenerated cellulosic sponge material throughout said matrix and curing said cellulosic dough mixture. In accordance with the present invention, it was discovered that when the cellulosic dough was cured, it compressed about the occluded sponge nodules, thereby increasing their density and stiffness. This increased density and stiffness of the sponge nodules provides the highly desirable abrasive property to the sponge.

The accompanying drawing illustrates by way of example one embodiment of the invention, wherein:

FIG. 1 is a plan view of a synthetic sponge made in accordance with the invention;

FIG. 2 is a sectional view taken in the direction of line 2—2 of FIG. 1; and

FIG. 3 is a partial plan view of another sponge of the invention with nodular inclusions of various colors.

Referring more particularly to the drawing, the sponge illustrated therein comprises a synthetic cellulose sponge matrix 10 of any suitable regenerated cellulose sponge mass form in which has been dispersed a scattering of discrete lumps or nodules 11 of cellulosic sponge material. The open pores of the sponge material are indicated at 12. The nodules 11 may be of any physical shape such as cubical, spherical, rod-like, or any other cut or torn or molded shape or the like as may be preferred. These nodules are dispersed throughout the sponge matrix and serve not only to provide the "lumpy" effect referred to, but also tend to increase the strength of the over-all sponge.

In carrying out the method in the manufacture of the product, the matrix cellulosic dough mixture is made of any suitable materials by any suitable method, and the nodules of sponge material are then added to the dough mixture, and are stirred therein so as to be dispersed throughout the mass, thereby becoming enclosed within the matrix sponge material. Because this latter is of synthetic cellulose sponge form, it shrinks and contracts upon the preformed sponge inclusions as an incident to the coagulating and regenerating of the matrix sponge material. Hence, the sponge inclusions become compacted and densified compared to the matrix material, thereby giving the over-all sponge product the desired scattered lumpy structure. Any of the known methods of preparing cellulosic sponges can be used in the preparation of the pre-made regenerated cellulosic sponge material and the matrix sponge material. Illustrative of such methods are those of the following U.S. Patents: 1,142,619; 1,611,056; and 1,909,629.

Since the scrap inclusions are of sponge material scattered throughout the finished sponge mass, the fluid absorptive characteristics of the finished sponge are not impaired. The inclusions may be made from sponge materials of different colors than the sponge matrix mix, to thus add to the novelty and attractiveness of the finished product. As shown in FIG. 3, these sponge inclusions may be of any number of colors which may be different from each other and different from the background color of the matrix material. Some inclusions, in the illustrated form, for example, are shown at 14 as being blue, others at 15 as of pink color, while others are green, yellow, orange, black and silver as shown at 16, 17, 18, 19 and 20 respectively. However, of course, the inclusions may be of one color either different than or of the same color as the sponge matrix mix. Also, it will be understood that the inclusion and matrix materials may be so processed and selected as to be of similar or different textures and pore size characteristics, as may be preferred.

It is a particular feature of the finished sponge product of the present invention that due to dissimilar densification and orientation of the structures comprising the inclusions and the matrix materials, the sponge is provided with a unique and improved "feel." When this sponge product is wet it is soft to the hand as is any other wetted cellulose sponge, but when kneaded, it distinctly demonstrates a novel scattered "lumpy" feel and is, for this reason, adapted to function as a scrubbing device in greatly improved manner compared to any previous type cellulose sponge.

Furthermore, it is a feature of the invention that this improved sponge product may be relatively inexpensively manufactured by means of conventional sponge-making processes while at the same time utilizing otherwise scrap sponge material for the nodular inclusion portions of the finished product, thereby effecting substantial economies in manufacture. Also, as stated hereinabove, novel and ornamental mixed coloring effects can be obtained by employing variously colored sponge inclusion and matrix mixes. Because the preformed inclusion portions are secondarily densified and impregnated and bonded to the new matrix material prior to curing of the latter, a novel and improved mechanical strength characteristic is provided in the finished sponge product.

It will be, of course, appreciated that whereas only a few forms of the sponge of the invention have been described in detail hereinabove, various changes may be made therein without departing from the spirit of the invention and the scope of the following claims.

The embodiments of the present invention in which an exclusive property or privilege is claimed, are defined as follows:

1. A synthetic sponge comprising a body of cellulosic sponge material having embedded in and dispersed throughout said body a plurality of pre-made regenerated cellulosic sponge material particles of greater density than said body.

2. A method of making a novel cellulose sponge which comprises making a cellulosic sponge dough matrix, dispersing particles of pre-made regenerated cellulosic sponge material throughout said matrix, and curing said matrix, thereby causing said particles to be compressed and to have a density greater than said cured matrix.

References Cited in the file of this patent

UNITED STATES PATENTS

| | | |
|---|---|---|
| 1,708,050 | Burlew | Apr. 9, 1929 |
| 2,077,412 | Herzog et al. | Apr. 20, 1937 |
| 2,133,805 | Brown | Oct. 18, 1938 |
| 2,880,726 | Stieg | Apr. 7, 1959 |

FOREIGN PATENTS

| | | |
|---|---|---|
| 748,990 | Great Britain | May 16, 1956 |